(12) United States Patent
Takeda

(10) Patent No.: US 7,106,673 B2
(45) Date of Patent: Sep. 12, 2006

(54) OPTICAL DISK RECORDING APPARATUS WITH OPTIMUM POWER CONTROL

(75) Inventor: Naoto Takeda, Toshima-ku (JP)

(73) Assignee: TEAC Corporation, Musashino (JP)

(*) Notice: Subject to any disclaimer, the term of this patent is extended or adjusted under 35 U.S.C. 154(b) by 133 days.

(21) Appl. No.: 10/266,627

(22) Filed: Oct. 9, 2002

(65) Prior Publication Data

US 2004/0233808 A1 Nov. 25, 2004

(30) Foreign Application Priority Data

Oct. 10, 2001 (JP) ............. 2001-313107
Apr. 8, 2002 (JP) ............. 2002-104786

(51) Int. Cl.
*G11B 7/0045* (2006.01)
(52) U.S. Cl. ................. 369/47.53
(58) Field of Classification Search ........ None
See application file for complete search history.

(56) References Cited

U.S. PATENT DOCUMENTS

| | | | | |
|---|---|---|---|---|
| 5,740,149 A | * | 4/1998 | Iwasaki et al. | 369/47.53 |
| 5,793,723 A | * | 8/1998 | Okuyama et al. | 369/47.5 |
| 5,850,378 A | * | 12/1998 | Ninamino et al. | 369/59.11 |
| 5,936,924 A | | 8/1999 | Tanaka | |
| 5,978,351 A | * | 11/1999 | Spruit et al. | 369/275.3 |

FOREIGN PATENT DOCUMENTS

| | | |
|---|---|---|
| JP | 6-349066 | 12/1994 |
| JP | 07-085494 | 3/1995 |
| JP | 10-83536 | 3/1998 |
| JP | 11-120566 | 4/1999 |
| JP | 30-59334 | 7/1999 |
| JP | 11-283250 | 10/1999 |
| JP | 2000-163749 | 6/2000 |
| JP | 2001-283436 | 10/2001 |
| WO | WO 00/41172 * | 7/2000 |

* cited by examiner

*Primary Examiner*—Thang V. Tran
*Assistant Examiner*—Christopher Lamb
(74) *Attorney, Agent, or Firm*—Christensen O'Connor Johnson Kindness PLLC

(57) ABSTRACT

An optical disk recording apparatus capable of recording data in an optical disk using an optimized recording power is provided. Data formed beforehand in an embossed part of the optical disk are reproduced with a predetermined reproducing power, using an optical pick up unit, and an evaluation index is determined by an evaluation index determining part of a control unit from an envelope of the signal which is produced with the reproducing power. Test data are recorded in a test area of the optical disk by varying the recording power and the test data thus recorded are reproduced with the reproducing power to determine the evaluation index. A control unit sets the evaluation index obtained from the embossed part as a target evaluation index. Desired data are recorded with the recording power corresponding to the target evaluation index.

7 Claims, 8 Drawing Sheets

OPTICAL DISK RECORDING APPARATUS WITH OPTIMUM POWER CONTROL

BACKGROUND OF THE INVENTION

1. Field of the Invention

The present invention relates to an optical disk recording apparatus, and more specifically to the power optimization of a light-emitting source used in an illumination system for an optical disk recording apparatus capable of recording data into an optical disk as an optical storage medium and of reproducing the recorded data.

2. Description of the Related Art

Traditionally, it is known that an optical disk is capable of recording the data of sound and/or image signals and further of reproducing the recorded data at need, and it is manufactured as DVD-R, DVD-RW, or the like.

In an optical disk recording apparatus for DVR-R, DVD-RW, or the like, the optimization of the recording power is carried out, before actually recording desired information data, and this procedure is normally referred to as OPC (Optimum Power Control). The term "recording power" described hereinafter means the light emitting intensity of a laser diode (LD) as a light-emitting element in the state of forming pits for recording, and the laser diode is used for recording/reproducing the data in an optical disk. In the OPC, the recording power is varied in a plurality of steps in several sectors, e.g., 16 steps in 16 sectors, and a test data is recorded in a test area provided in a predetermined location of the optical disk. Thereafter, each test data is reproduced in a sector to evaluate its quality. Normally, either a beta value $\beta$ or a modulation factor m is used as an evaluation index (parameter) for the quality of reproduction. Hereinafter, this value is represented as an evaluation index E.

The beta value $\beta$ is a parameter which is derived from the peak voltage (A) and bottom voltage (B) of an envelope of an AC coupled reproduction RF signal as $\beta=(A+B)/(A-B)$. The recording power is assumed to be optimum for the signal quality in the recording, when the beta value resides within a predetermined range (for instance, 0.04 to 0.05). The AC-coupled reproducing RF signal is an AC signal, which is obtained after the DC component is removed from the initial reproducing RF signal. The recording power, at which a desired beta value (reference beta value) may be obtained, is determined as an optimum recording power Pwo. Thereafter, all of the data are recorded at the optimum recording power Pwo thus determined.

The modulation factor m is a parameter which is derived from the peak voltage (A) and the bottom voltage (B) of an envelope of a reproduction RF signal having the DC component as $m=(A-B)/A$. The recording power is assumed to be optimum, when the modulation factor is within a predetermined range (for instance, 0.6 to 0.7). The recording power, at which a desired modulation factor (reference modulation factor) may be obtained, is determined as an optimum recording power Pwo. Thereafter, all of the data are recorded under the condition of the optimum recording power Pwo thus determined.

In Japanese Unexamined Patent Publication No. 7-85494, a method for determining the optimum recording power is described, in which a first beta value less than a desired beta value and a second beta value greater than the desired beta value are initially determined, and an apparent power step, in which the desired beta value can be obtained, is determined from the power steps in which the first and second beta values are obtained, using the direct approximation or the like, so that the recording power in the power step closest to the apparent power step is determined as the optimum recording power.

Moreover, in an optical disk recording apparatus for an optical disk such as DVD-RW, the eliminating power is further used. The eliminating power described herein means the intensity of light emitted from LD in the state of eliminating the recorded data. The optimum eliminating power Peo is determined from the optimum recording power Pwo according to a formula $Peo=\epsilon o \cdot Pwo$, using a coefficient $\epsilon o$ (the ratio of the eliminating power to the recording power) stored in a microcomputer built in the optical disk recording apparatus, or a coefficient $\epsilon o$ recorded as ATIP (Absolute Time In Pre-groove) information in the optical disk.

There are various types of optical disks used for recording and reproduction. Moreover, the recording property and the production quality of the optical disk are different from disk to disk, so that the value of the reference evaluation index is also different from disk to disk. The optimum recording power can be determined using a preset evaluation index having a known value (e.g., for the beta value $\beta=0.04$ or for the modulation factor $m=0.6$). However, since the reference evaluation index is different from disk to disk, the recording power thus determined dose not always provide the best recording quality. In fact, there is a possibility that the recording power may be set on the basis of the evaluation index greater than the optimum evaluation index inherent in the disk. In this case, since the recording is carried out using a recording power greater than the optimum recording power, the layer for recording in the optical disk deteriorates and there is a possibility of greatly reducing the rewriting durability of the optical disk.

On the other hand, it is possible that a table is pre-installed in a microcomputer built in an optical disk recording apparatus and each disk medium maker calculates reference evaluation indexes and stores them in the table. In this case, the process of manufacturing the apparatus becomes complicated. If an optical disk having no reference evaluation index is inserted into the apparatus, it is impossible to carry out the suitable action.

In the case of optical disk recording apparatuses (disk drives) manufactured by same maker, even if the evaluation index is calculated with the same optical disk, the calculated value of the evaluation index is different form optical disk recording apparatus to optical disk recording apparatus due to a distribution in the wavelength of LD (laser diode) used in a optical pickup unit, a difference in the optical property thereof and an error in the accuracy of calculation in the circuit of determining the evaluation index. Therefore, even if a combination of a disk drive and an optical disk provides an optimum recording power at a reference evaluation index (for instance, beta value $\beta=0.04$ or modulation factor $m=0.6$), an optimum recording quality cannot always be obtained using the other disk drive and the same reference evaluation index.

It is possible that the calculation error of the evaluation index for each optical disk recording apparatus is determined in advance in the course of manufacturing the respective apparatuses and thereby the reference evaluation index for each disk medium maker is corrected. This procedure further provides a complicity in the treatment. A change in the recording property of the optical disk with the passage of time and a change in the optical property of the pick up unit cause the accuracy of correction to be reduced.

SUMMARY OF THE INVENTION

In view of the above described problems in the prior art, it is an object of the present invention to provide an optical disk recording apparatus in which an optimum recording power can be determined for each optical disk to be used as well as for each optical disk recording apparatus to be used, so that desired data can be recorded in high quality and also the data thus recorded can also be reproduced in high quality.

In accordance with the present invention, the object is attained by an optical disk recording apparatus for recording desired data in an optical disk and reproducing the recorded data from the optical disk having an embossed part in which reproducing data exclusively used are beforehand formed, an test area capable of recoding a test data and a recording area for recording desired data, said optical disk recording apparatus comprising: means for reproducing said data in said embossed part with a predetermined reproducing power and for determining a target evaluation index by detecting an evaluation index from the RF signal reproduced from said embossed part; means for recording said test data in said test area varying the recording power and for reproducing said test data thus recorded with said predetermined reproducing power to determine an evaluation index from the RF signal thus obtained; means for storing said target evaluation index, the respective recording powers employed and the evaluation indexes corresponding thereto; and means for determining as an optimum recording power the recording power at which said target evaluation index stored in said storage means may be obtained, based on the relationship of the evaluation index and the respective recording power, said relationship being also stored in said storage means; and means for recording the desired data onto said optical disk at the determined optimum recording power.

In an aspect of the invention, the target evaluation index is the evaluation index itself, which is determined from said reproduced RF signal obtained by reproducing said data exclusively used for reproducing in the embossed part.

In another aspect of the invention, the target evaluation index is a value obtained by multiplying by a predetermined coefficient exclusive of zero and one the evaluation index, which is determined from said reproduced RF signal obtained by reproducing said data exclusively used for reproducing in the embossed part.

In another aspect of the invention, the target evaluation index is a value obtained by adding or subtracting a predetermined constant exclusive of zero to the evaluation index, which is determined from said reproduced RF signal obtained by reproducing said data exclusively used for reproducing in the embossed part.

In another aspect of the invention, the target evaluation index is determined, respectively in accordance with the recording of the lands and grooves.

In further another aspect of the invention, the evaluation index is a beta value $\beta$, which can be determined as $\beta=(A+B)/(A-B)$ from the peak voltage A and the bottom voltage B of an envelope of the AC coupled reproduced RF signal.

In further another aspect of the invention, the evaluation index is a modulation factor m, which can be determined as $m=(A-B)/A$ from the peak voltage A and the bottom voltage B of an envelope of the reproduced RF signal containing a DC component.

As described above, the optical disk according to the invention optimizes the recording power on the basis of the evaluation index which may be obtained by reproducing the data in the embossed part of an optical disk prior to recording desired data in the optical disk, in which case, the embossed part is formed beforehand so as to include the data exclusively used for reproducing. The evaluation index obtained by reproducing the data in the embossed part is different from disk to disk as well as from apparatus to apparatus. Since, moreover, the embossed part is formed beforehand in the course of manufacturing the optical disk, the evaluation index resulting from reproducing the data in the embossed part can be obtained under the best condition. The determination of the target evaluation index on the basis of the obtained evaluation index provides an appropriate target evaluation index for each set of an optical disk and an optical disk recording apparatus, thereby making it possible to obtain an optimized recoding power for the set.

The write-once type optical disk DVD-R has a recording layer of an organic coloring matter system, and generally the signal quality and/or the recording conditions are evaluated in the DVD-R media, based on the beta value. On the contrary, the re-writable type optical disk DVD-RW has a recording layer of phase transition type, and the reproducing is carried out in accordance with the difference in the intensity of light reflected from pits, where the amorphous state exhibits a lower reflection power, compared with the crystalline state. The signal quality and/or the recording conditions are evaluated in the DVD-RW media, based on the modulation factor. Since the reflective power of light depends on the recording property of the optical disk, a suitable evaluation index, i.e., beta value or modulation factor, is used in accordance with the media used.

Further objects, features and advantages of the present invention will become apparent from the following description of the preferred embodiments with the reference to the attached drawings.

DESCRIPTION OF THE PREFERRED EMBODIMENTS

Figure 1:
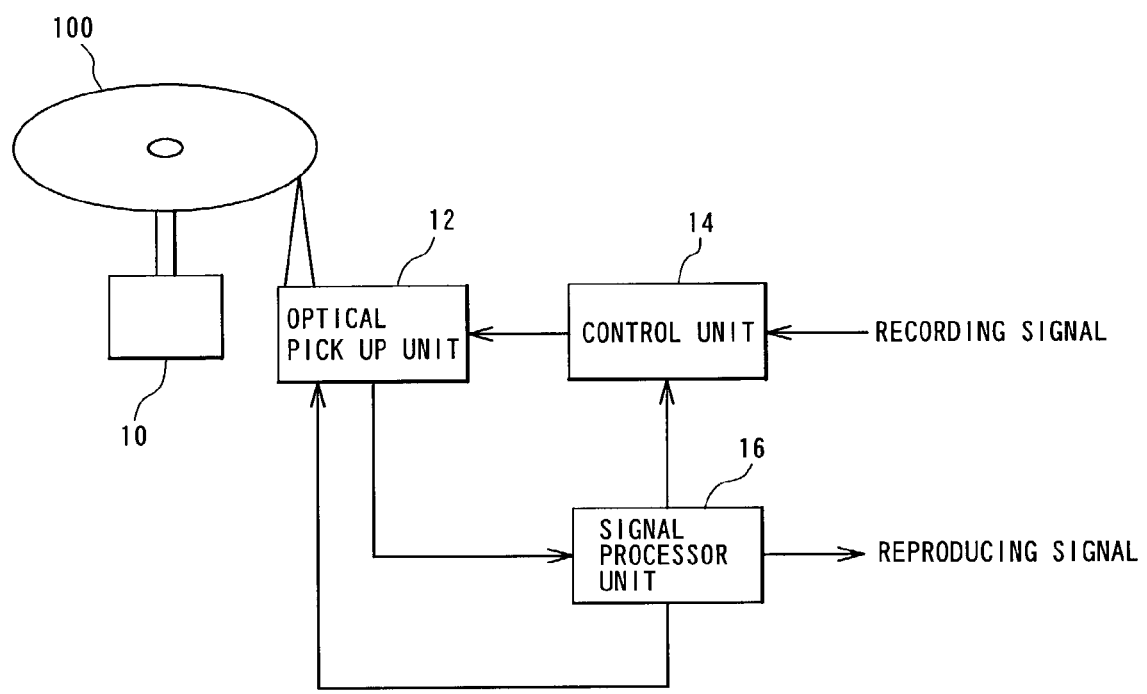
FIG. 1 is a block diagram showing the main part of an optical disk recording apparatus according to the invention.

Referring now to the drawing, the preferred embodiments of the present invention will be described in detail.

FIG. 1 is a block diagram showing the main part of an optical disk recording apparatus 1 according to the invention. The optical disk recording apparatus 1 comprises a disk rotation drive unit 10 including a spindle motor, a pick up unit 12, a control unit 14 and a signal process unit 16.

The optical pick up unit 12 includes a light-emitting element, i.e., a laser diode (LD) for illuminating an optical disk 100 with a very small laser light spot to record and/or reproduce data, a light-receiving element and a focusing optics for focusing the light emitted from the light-emitting element onto the optical disk. A driving signal for recording is supplied from the control unit 14, and the data is recorded in the form of pits having a length of 3T to 14T (where T is a reference period for a length in the track direction). Moreover, a laser light having a reproducing power is focused on optical disk 100 to receive the light reflected therefrom, and then a reproducing RF signal corresponding to the reflected light is supplied to the signal process unit 16. "The reproducing power" descried herein means the light intensity emitted from the LD in the case of reproducing.

The signal process unit 16 demodulates the reproducing RF signal to output it as a reproducing signal. In the demodulation, the noise is rejected from the RF signal by a filter (for example, LPF; not shown) and the waveform of the signal is shaped by an equalizer (not shown), and then the reproducing data are extracted using a synchronization clock generated by a phase locked loop (PLL) circuit (not shown). In this case, the signal process unit 16 receives a tracking error signal and a focus error signal from the optical pick up unit 12 to supply a servo signal to the optical pick up unit 12. Moreover, the signal process unit 16 supplies the reproduced RF signal to the control unit 14.

The control unit 14 generates a driving signal for driving LD in the optical pick up unit 12, based on the recording signal supplied from a precedent apparatus. Moreover, the control unit 14 optimizes the recording power (OPC) prior to the actual data recording. In the OPC, as described above, the recording power is stepwise altered within 16 steps in each of 16 sectors, and test data in a test area, which is disposed beforehand in the optical disk, are recorded, and then each test data is reproduced in each sector, so that the evaluation index is determined. After determining the evaluation index for each recording power, the control unit 14 sequentially stores the evaluation indexes as a function of the recording power (the function of the evaluation index vs. the recording power) and then determines as an optimum recording power the recording power from which a target evaluation index can be obtained. Specifically, the evaluation index, which is obtained by reproducing the data in an embossed part of the optical disk 100, is set to be a target evaluation index, and then the recording power in which the target evaluation index may be obtained is determined. In this case, the embossed part has been formed beforehand in the process of manufacturing. In the prior art, the control unit 14 uses a known value (for instance, beta value $\beta=0.04$ or modulation factor $m=0.6$) as the reference evaluation index (the target evaluation index). On the contrary, in accordance with the present invention, the reference evaluation index (the target evaluation index) is determined for each optical disk as well as for each optical disk recording apparatus 1. When the data is recorded after determining the optimum recording power, the control unit 14 may control the recording power based on ROPC (Running Optimum Power Control), if necessary. In the ROPC described herein, the intensity of the light reflected from pit areas on an optical disk is measured respectively in the cases of the OPC and data recording, the optimum recording power is corrected at any time so as to maintain a constant intensity of the reflected light based on the comparison of the intensities of the reflected light in both cases.

Figure 2:
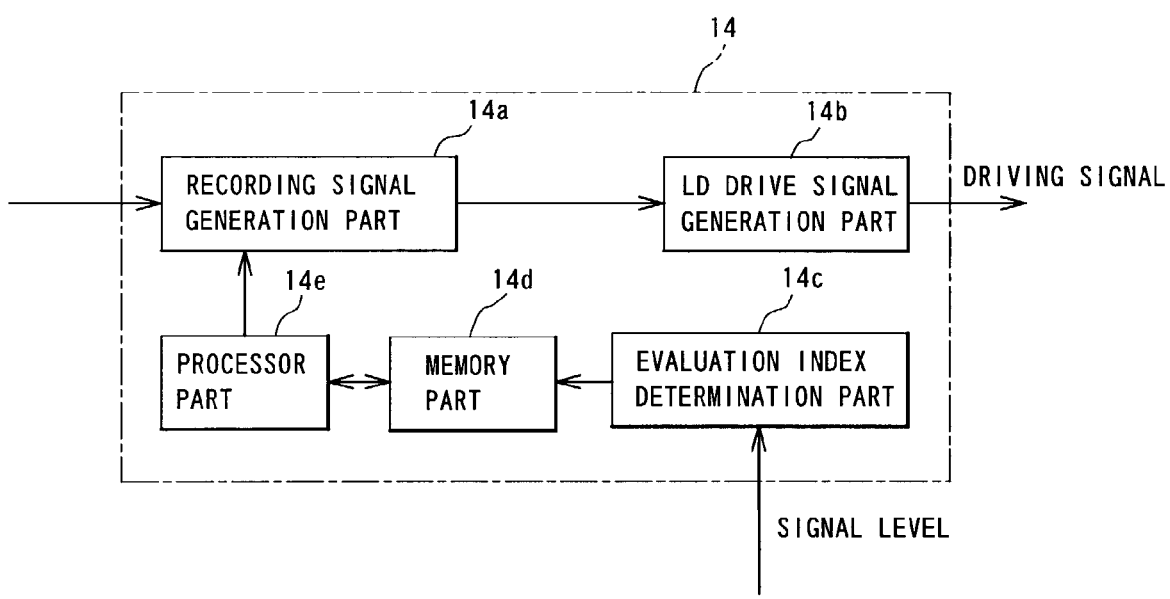
FIG. 2 is a block diagram showing the control unit in FIG. 1.
Figure 3:
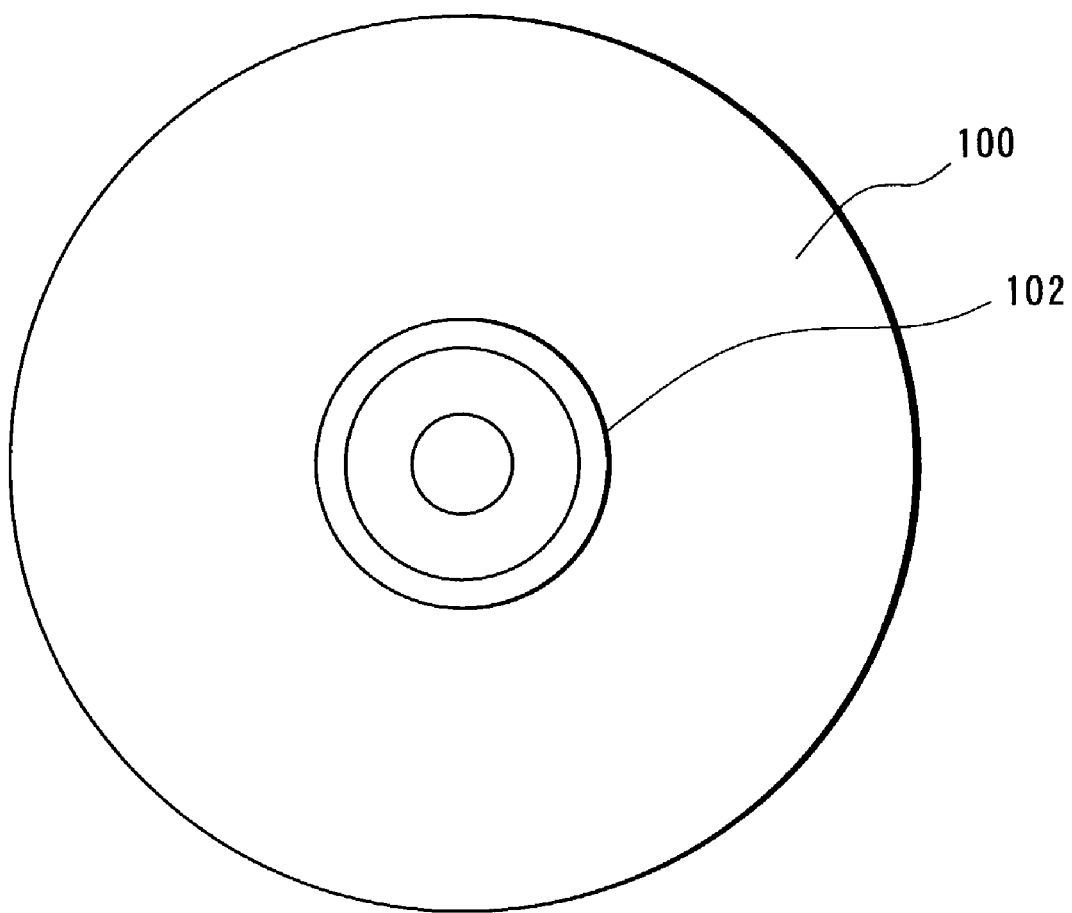
FIG. 3 is a plan view schematically showing an optical disk.

FIG. 2 is a block diagram showing the functional arrangement of the control unit 14. Actually, the control unit 14 is constituted by a DSP (digital signal processor), and it includes as functional elements a recording signal generation part 14a, an LD driving signal generation part 14b, an evaluation index determination part 14c, a memory part 14d and a processor part 14e.

The recording signal generation part 14a performs an 8/16-modulation for the recording signal to generate a recording signal at a transmission rate in accordance with the recording speed of the optical disk 100. In this case, it is preferable that the recording signal should be corrected prior to the output by an optimum strategy (a rule for the light-emitting wave form of the recording pulse) specified in accordance with the type of the optical disk 100 and the disk maker in order to form pits having a desired size and shape.

In the case of OPC, one of recording power pulses in 16 steps, which are stored in the form of a table in the memory part 14d, is output to drive LD in the optical pick up unit 12 via the LD driving signal generation part 14b.

The evaluation index determination part 14c determines a beta value $\beta$ for each recording power from an envelope of an AC coupled RF signal for test data recorded with 16 steps recording powers in the OPC by a formula of the beta value $\beta=(A+B)/(A-B)$, where A and B are the peak and bottom voltages of the envelope, respectively. Alternatively, the evaluation index determination part 14c determines a modulation factor m for each recording power from an envelope of an RF signal containing a DC component for test data recorded with 16 steps recording powers in the OPC by a formula of the modulation factor $m=(A-B)/A$, where A and B are the peak and bottom voltages of the envelope, respectively. The evaluation index (beta value $\beta$ or modulation factor m) thus determined is sequentially supplied to the memory part 14d. In the case where the evaluation index determined in the evaluation determination part 14c is a beta value $\beta$, the RF signal supplied from signal processor unit 16 is AC-coupled to the evaluation index determination part 14c via a decoupling capacitor or the like. In the case of modulation factor m, however, the RF signal is directly introduced into the evaluation index determination part 14c without the decoupling capacitor.

There are two types of evaluation indexes which are determined in the evaluation index determination part 14c: One is the first evaluation index, which results from the reproduced RF signal obtained from the data in the embossed part of the optical disk 100, whereas the other is the second evaluation index, which results from the reproduced RF signal obtained by reproducing the pits which are recorded in a test area of the optical disk 100 under the condition of various recording powers, as described above. The first evaluation indexes obtained from the embossed part are also supplied to the memory part 14d.

Accordingly, the first evaluation indexes obtained by reproducing the data in the embossed part of the optical disk 100 as well as the second evaluation indexes obtained by reproducing the pits, which are recorded with the varied recording powers in the predetermined test area of the optical disk 100 are stored in the memory part 14d. The second evaluation indexes, which are obtained by reproducing the pits recorded in the test area, are stored together with corresponding the recording powers in such a manner that they are (power Pw1, E1), (power Pw2, E2), . . . in two dimensional data, in other words, (Pw1, β1), (Pw2, β2), . . . , or (Pw1, m1), (Pw2, m2), . . . The relationship between the recording power and the second evaluation index can be stored as a parameter of a function therein, using the functional approximation (the function of the beta value vs. the power or the function of the modulation factor vs. the power).

The processor part 14e determines the recording power for the target evaluation index as the first evaluation index in the embossed part stored in the memory part 14d, based on the relationship between the recording power and the second evaluation index, said relationship being stored in the memory part 14. Thereby the processor part 14e selects as an optimum recording power the recording power at which the target evaluation index can be obtained, and then supplies it to the recording signal generation part 14a.

In accordance with the invention, the embossed part means the information pits (pre-recorded pits) formed beforehand in a control data zone 102, which is used exclusively to reproduce the data in the inner part of the optical disk 100. The first evaluation indexes obtained from the embossed part can be determined by reproducing the information pits in the control data zone 102.

In the following, the function of the control unit 14 in the optical disk recording apparatus 1 according to the invention will be described in detail.

Figure 4:
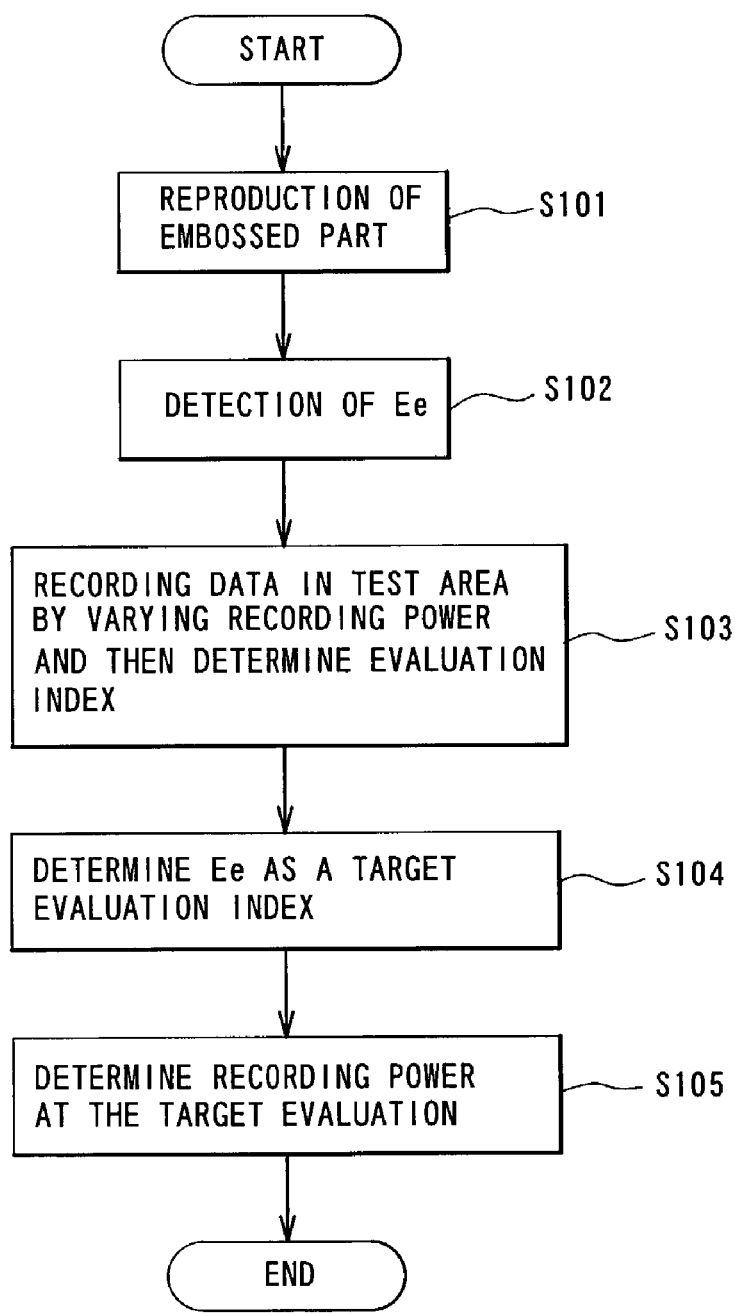
FIG. 4 is a flowchart showing the process carried out in the control unit.

FIG. 4 is a flowchart performed in the control unit 14 in the OPC. When the control unit 14 receives an instruction of recording from a precedent apparatus, the information pits in the embossed part is reproduced with a predetermined reproducing power by activating the optical pick up unit 12 (S 101). An evaluation index is determined from the reproduced RF signal thus obtained, and then the evaluation index Ee (beta value βe or modulation factor me) thus determined is transmitted to the memory part 14d (S 102). In this case, it is assumed that the evaluation index is more reliable than the evaluation index, which can be obtained by reproduction after the data is recorded in the optical disk 100. This is due to the fact that the information pits in the embossed part are pre-formed in the manufacture of optical disk and therefore they are produced under the best condition.

Subsequently, the control unit 14 activates the optical pick up unit 12 to form pits in the test area with various recording powers. Thereafter, the pits are reproduced to determine the evaluation index, and then the evaluation indexes thus obtained are stored in the memory part 14d (S 103). Actually, test data are recorded in a predetermined test area (PCA, power calibration area) of the optical disk, using the recording power, which is stepwise increased in the 16 steps. The recording powers in this case are assumed to be Pw1, Pw2, . . . , Pw16. The test data, which are recorded at varied recording powers are sequentially reproduced to determine the corresponding evaluation index, and it is assumed that the evaluation indexes E1, E2, . . . , E16 can be obtained for each recording power are Pw1, Pw2, . . . , Pw16.

Figure 5A:
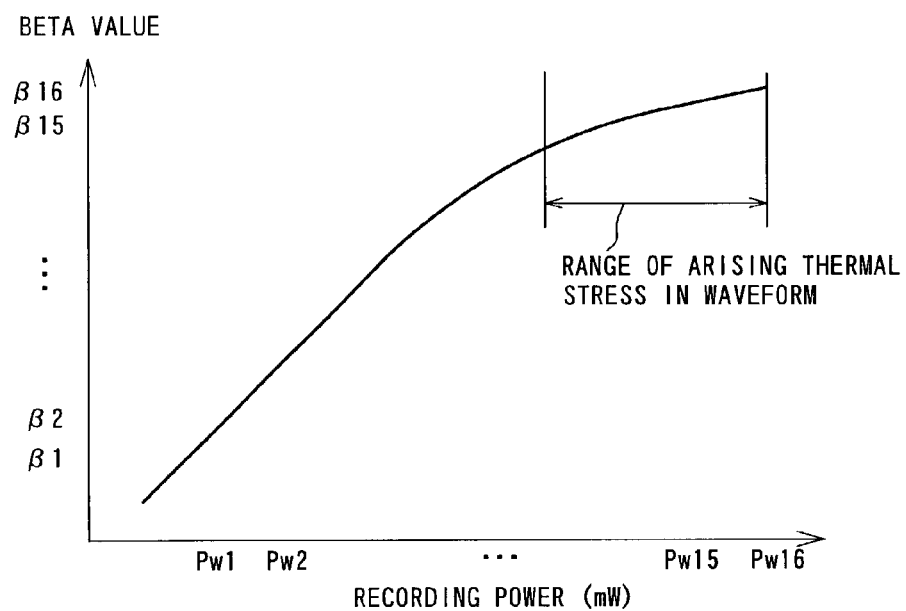
FIG. 5A is a diagram showing the relationship between the recording power and the beta value.
Figure 5B:
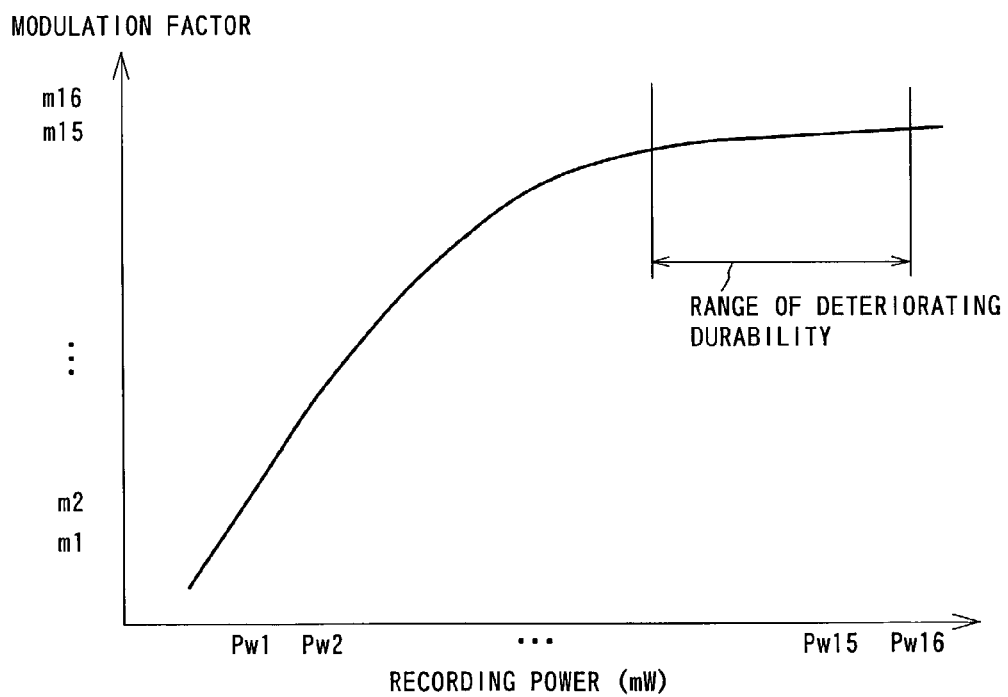
FIG. 5B is a diagram showing the relationship between the recording power and the modulation factor.

FIGS. 5A and 5B respectively represent diagrams each showing the relationship between beta values β1 to β16 and the recording power Pw1 to Pw16 or between modulation factor m1 to m16 and the recording power Pw1 to Pw16, in which case, pits are formed in the predetermined test area by sequentially changing the recording power, and then the evaluation indexes, i.e., the beta values or modulation factors are determined by reproducing the pits thus formed with a predetermined reproducing power. In FIG. 5A, it is found that in the initial stage the beta value increases linearly with the increase of the recording power, and then the gradient of the beta value relative to the recording power decreases. It can be stated, therefore, that the recording poser in this area provides a thermal stress in the waveform of the RF signal. In FIG. 5B, it is similarly found that in the initial stage the modulation factor value increases linearly with the increase of the recording power, and then the gradient of the modulation factor relative to the recording power decreases and finally the modulation factor saturates in its change. In this saturation area, the recording power provides a thermal stress in the waveform of the RF signal, thereby deteriorating the quality of the recording layer in the optical disk and causing the rewrite durability of the optical disk to be reduced.

The control unit 14 memorizes the relationship between the recording power Pw and the evaluation index E, and then determines as a target evaluation index the evaluation index Ee, which is obtained by reproducing the information pits in the embossed part (S 104). Thereafter, the control unit 14 determines the recording power (optimum recording power) in which the target evaluation index can be obtained, based on the relationship between the recording power and the evaluation index E stored in the memory part 14d. Subsequently, the control unit 14 controls the power of LD in the optical pick up unit 12 to record the data with the optimum recording power Pwo (S 105). When the relationship between the recording power and the evaluation index is discretely stored in the form of (Pwi, Ei) (i=1, 2, . . . ) in the memory part 14d, the recording power corresponding to the target evaluation index can be determined from the relationship by the interpolation method.

Figure 6A:
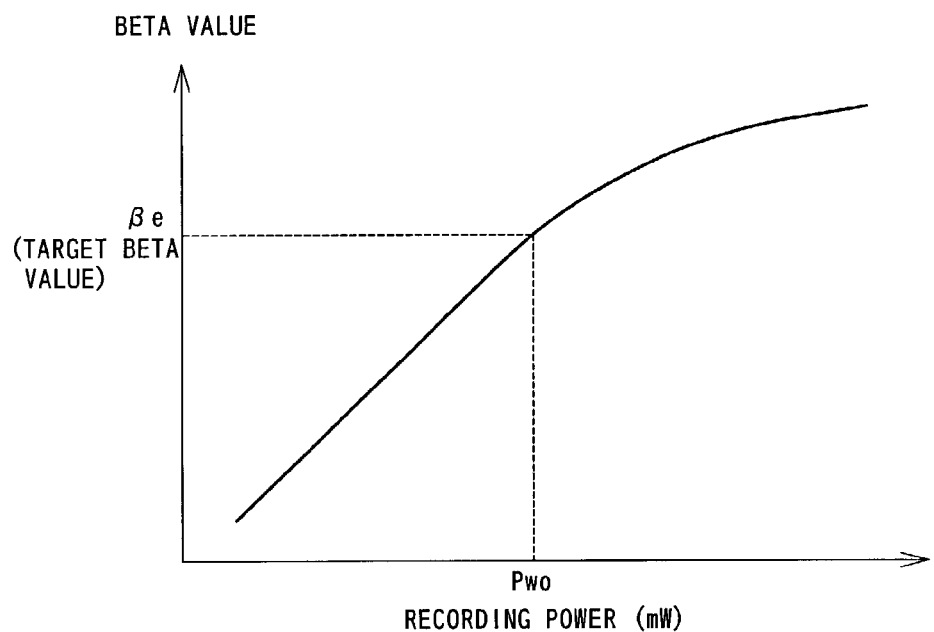
FIG. 6A is a diagram showing the relationship between the target beta value and the optimum recording power.
Figure 6B:
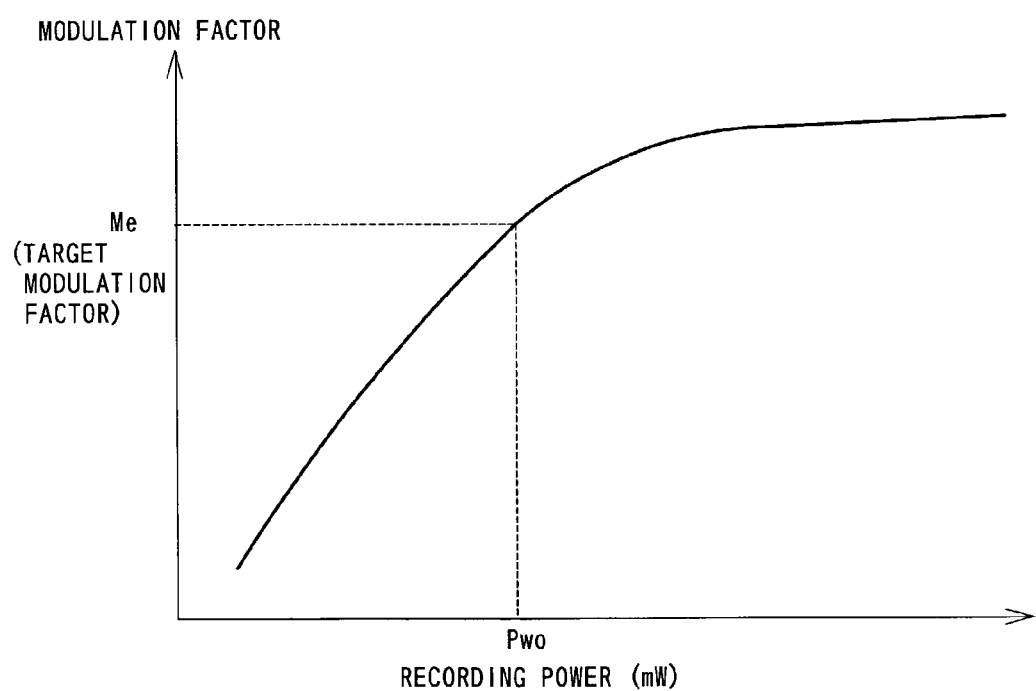
FIG. 6B is a diagram showing the relationship between the target modulation factor and the optimum recording power.

FIGS. 6A and 6B are diagrams showing the relationship between the target evaluation index Ee (target beta value βe or target modulation factor me) and the optimum recording power Pwo. The evaluation index Ee in the embossed part (information pits) is determined as a reference evaluation index by the combination of an optical disk 100 and an optical disk recording apparatus 1 and therefore indicates the quality of the signal reproduced by both the optical disk 100 and the optical disk recording apparatus 1. The quality of the reproduced signal is determined as a target evaluation index Ee in the case of recording data, and the recording power Pwo at which the target evaluation index can be obtained is determined as an optimum recording power. Therefore, it should be noted that the recording power Pwo is not determined for a fixed evaluation index, but dynamically varies in response to the evaluation index Ee for the embossed part.

In accordance with the embodiment of the invention, an optimum recording can be attained, when data is recorded in another optical disk 100 or when the data is recoded by another optical disk recording apparatus 1, because the recording power is optimized by using as a target evaluation index the evaluation index Ee obtained by reproducing the data in the embossed part which is formed beforehand in the optical disk 100.

Figure 7A:
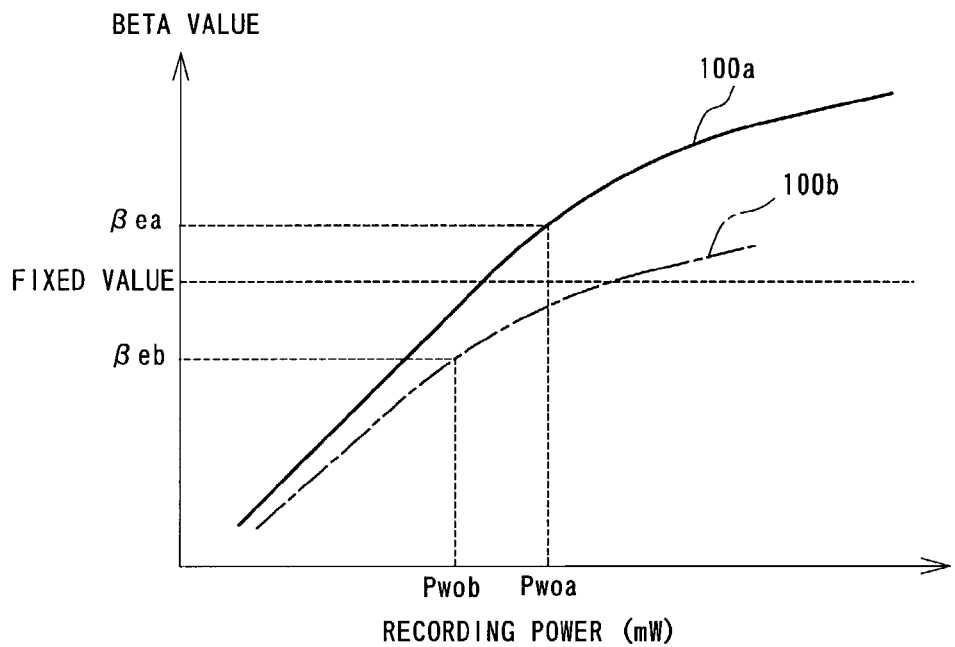
FIG. 7A is a diagram showing the property of the recording power vs. the beta value for two different optical disks.
Figure 7B:
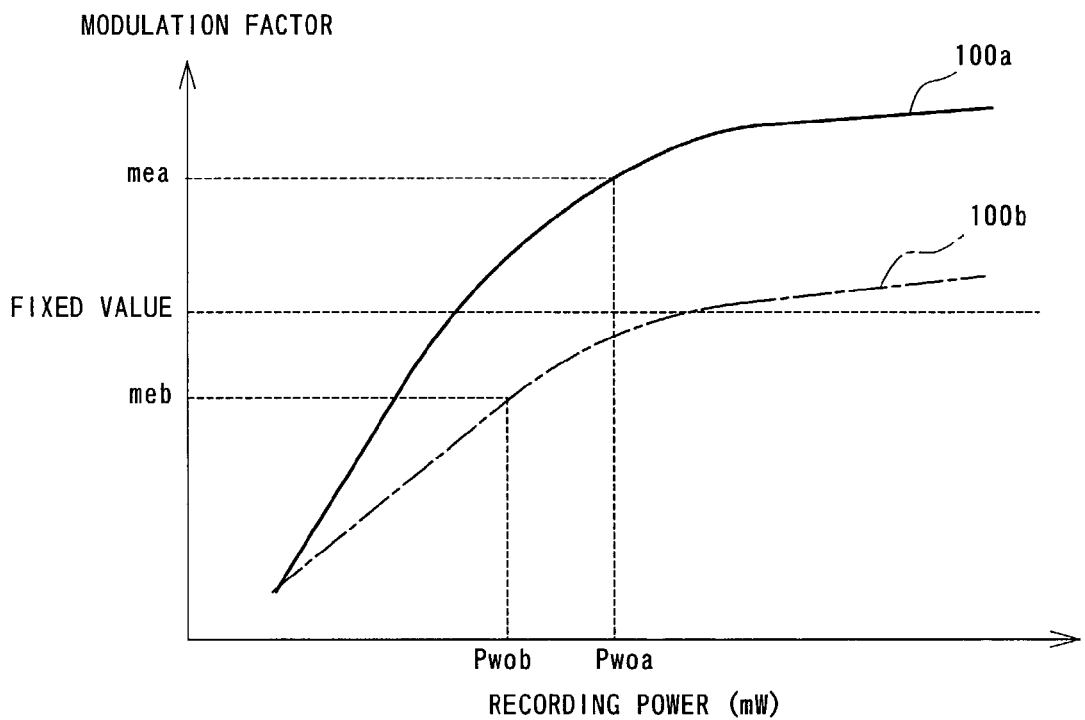
FIG. 7B is a diagram showing the property of the recording power vs. the modulation factor for two different optical disks.

FIGS. 7A and 7B are diagrams showing the property of the evaluation index (the beta value β or the modulation factor m) vs. the recording power, when data is recorded in two different optical disks 100a and 100b using an optical disk recording apparatus 1 according to the invention. In this case, the solid and dotted lines represent the properties of optical disks 100a and 100b, respectively. As can be recognized in these diagrams, the evaluation indexes Eea and Eeb, which are determined by reproducing the data in the embossed parts of the optical disks 100a and 100b, are different from each other, and the target evaluation indexes obtained therefrom also are different from each other. As a result, the recording power becomes Pwoa and Pwob for the optical disks 100a and 100b, respectively. If the target evaluation index (reference evaluation index) is set as a fixed value, the recording power in the optical disk 100a is determined as for the evaluation index, which is less than the optimum evaluation index Eea. As a result, a reduced recording power is obtained, so that a sufficiently good quality of recording cannot be obtained, thereby making it possible to deteriorate the quality of recorded signal. On the other hand, the recording power in the optical disk 100b is determined as for the evaluation index, which is greater than the optimum evaluation index Eeb. Therefore, as shown in FIG. 7A, the recording power becomes so large that a marked thermal stress takes place in the waveform of the RF signal, thereby making it impossible to reproduce the data in the optical disk. In conjunction with the above, a deterioration of the recording layer in the optical disk further reduces the durability of rewriting the optical disk, as shown in FIG. 7B.

Figure 8A:
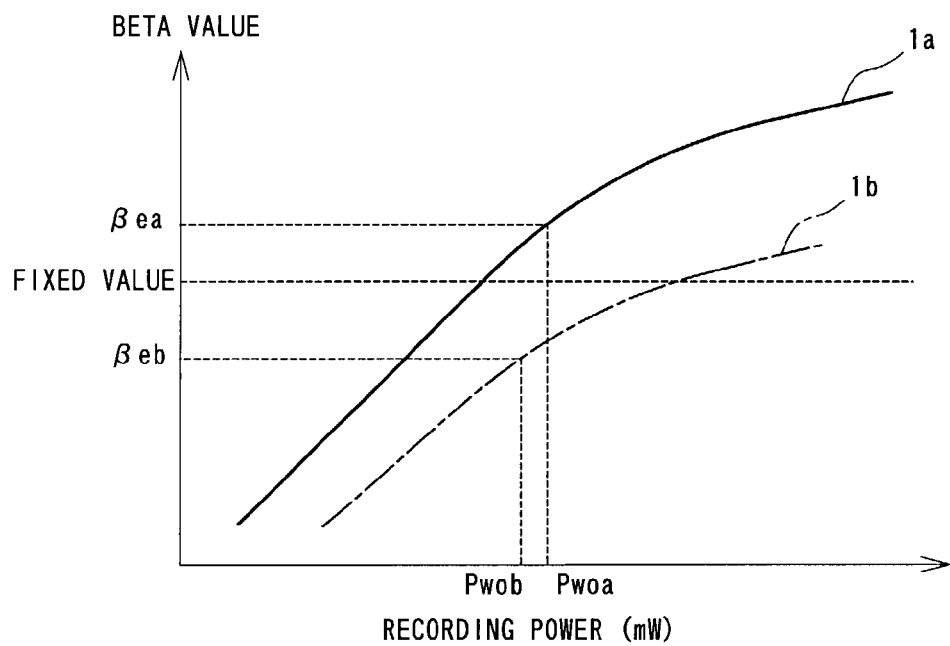
FIG. 8A is a diagram showing the property of the recording power vs. the beta value for two different optical disk recording apparatuses.
Figure 8B:
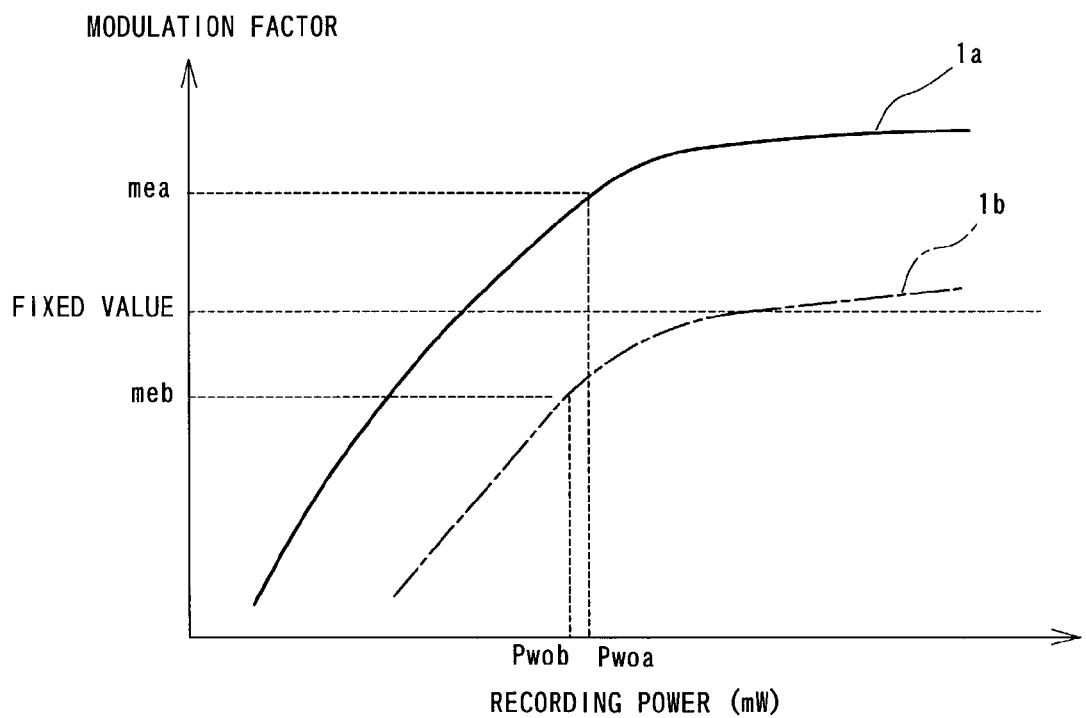
FIG. 8B is a diagram showing the property of the recording power vs. the modulation factor for two different optical disk recording apparatuses.

FIGS. 8A and 8B are diagrams showing the property of the recording power vs. the evaluation index (the beta value β or the modulation factor m) in the case of recording data into an optical disk 100 using two different optical disk recording apparatuses 1a and 1b according to the invention. The solid and dotted lines show the properties obtained by the optical disk recording apparatuses 1a and 1b, respectively. From the diagrams, it is found that a difference in the optical disk recording apparatus provides an error in the measurement of the evaluation index due to a very small difference in the electrical property of components in the measuring circuits and/or the optical property of the pick up unit, even if the optical disks has the same structure and they are manufactured in the same process. As can be recognized, the optical disk recording apparatuses 1a and 1b provides different evaluation values Eea and Eeb, respectively, when the data recorded in the embossed part of the same optical disk is reproduced. Accordingly, different target evaluation indexes can also be obtained for the same optical disk using the different optical disk recording apparatuses 1a and 1b. As a result, the optical disk recording apparatuses 1a and 1b provide a difference in the optimum recording power, that is, Pwoa and Pwob, respectively. If a fixed target evaluation index (reference evaluation index) is used for the different optical disk recording apparatuses 1a and 1b, the recording power having a smaller value is determined with the optical disk recording apparatus 1a under the condition of an evaluation index which is smaller than the optimum evaluation index Eea, whereas the recording power having a greater value is determined with the optical disk recording apparatus 1b under the condition of an evaluation index which is smaller than the optimum evaluation index Eeb. In other words, the difference in the optical disk recording apparatus provides a marked difference in the recording power for the same optical disk 100 and therefore there is a possibility that an optimum recording power cannot always be obtained. However, in the optical disk recording apparatus 1 according to the invention, the evaluation index, which is determined by reproducing the data pre-formed in the embossed part of the optical disk 100, is used as a target evaluation index, so that the difference in the optical disk recording apparatus can be overcome. Consequently, the recording can be carried out under the condition of the best recording power irrespective of a difference between the optical disk recording apparatuses.

Moreover, the target evaluation index Ed can also be calculated, using the evaluation index Ee that is determined by reproducing the data in the embossed part. More specifically, using a coefficient Dw, from the relationship, $$Ed = Ee \cdot Dw, \quad (1)$$

the target evaluation index Ed can be determined, where $$-1.5 < Dw < 1.5 \text{ for beta value } \beta, \quad (2)$$

$$0.8 < Dw < 1.5 \text{ for modulation factor } m,$$

in which case, Dw in equation (2) excludes zero.

The meaning of equation (1) is as follows: Regarding the beta value β, when there is an error in the beta value β obtained by the optical disk recording apparatus (disk drive) 1 or when there is a driving error in the LD, the target beta value βd is determined by varying the beta value βe determined by the disk drive by a predetermined value or by predetermined ratio, and if the beta value thus obtained is used as a target beta value (reference beta value) in the actual case of recording data, the recording power can be determined in a better accuracy, after offsetting the errors. Regarding the modulation factor, the target modulation factor md is calculated under the condition of Dw<1, when the durability of the optical disk is regarded as important, whereas the target modulation factor md is calculated under the condition of Dw>1, when the enhancement in the quality of recording in the optical disk 100 and/or with the disk drive is regarded as important. When the target modulation factor thus obtained is used as a target modulation factor (reference modulation factor) in the actual case of recording the data, the recording power can be determined, taking into account the property of the optical disk recording apparatus (disk drive) 1 and/or the property of the optical disk medium.

In conjunction with the above, the coefficient Dw can be determined for each optical disk recording apparatus (disk drive) 1 and for each disk medium maker (for instance, Dw=1.2 for the beta value or Dw=0.9 for the modulation factor), and can be stored in a memory part included in the disk drive 1.

Moreover, in the case of recording data in both the land parts and the groove parts of an optical disk 100, the land parts and groove parts have a different recording property. Therefore, it is preferable that the above procedure is conducted for each of the land parts and the groove parts and then the best recording power can be separately determined for the land parts and the groove parts. In this case, the target evaluation index for one of the land parts and the groove parts can be determined by multiplying the target evaluation index resulting from the reference evaluation index Ee for the other of the land parts and the groove parts by a predetermined coefficient. Moreover, different coefficients can be employed for the land parts and groove parts, when the target evaluation index Ed is determined on the basis of the reference evaluation index Ee.

In one of the above-described embodiments, the target evaluation index Ed is determined from the reference evaluation index Ee on the basis of the equation (1). However, using an equation (3), together with, e.g., a fixed constant M, $$Ed = Ee + M \quad (3)$$

the target evaluation index Ed can also be determined from the reference evaluation index Ee. In this case, M does not contain zero and satisfies the following relation, for instance, $-5.0 < M < 5.0$ for the beta value β and $-0.2 < M < 0.2$ for the modulation factor m.

In another embodiment, the target evaluation index Ed can also be determined from the reference evaluation index Ee, using a relation Ed=f(Ee), where the symbol f means a suitable function.

While preferred embodiments have been shown and described, various modifications and substitutions may be made without departing from the spirit and scope of the invention. Accordingly, it is to be understood that the present invention is described by way of example, and not by limitation.

What is claimed is:

1. An optical disk recording apparatus for recording desired data in an optical disk and reproducing the recorded data from the optical disk having an embossed part in which data exclusively used for reproducing are beforehand formed, a test area capable of recording a test data, and a recording area for recording desired data, said optical disk recording apparatus comprising:

means for reproducing said data in said embossed part with a predetermined reproducing power and for determining a target evaluation index for the optical disk by calculating an evaluation index based on the RF signal reproduced from said embossed part of the optical disk;

means for recording said test data in said test area by varying the recording power and for reproducing said test data thus recorded with said predetermined reproducing power to calculate a test evaluation index from the RF signal thus obtained for each of the varied recording powers;

means for storing said target evaluation index, the respective recording powers employed, and the test evaluation indexes corresponding thereto;

means for determining as an optimum recording power the recording power at which said target evaluation index stored in said storage means may be obtained, based on the relationship of the test evaluation index and the respective recording power, said relationship being also stored in said storage means; and means for recording the desired data onto said optical disk at the determined optimum recording power.

2. An optical disk recording apparatus according to claim 1, wherein the target evaluation index is the evaluation index itself, which is determined from said reproduced RF signal obtained by reproducing said data exclusively used for reproducing in the embossed part.

3. An optical disk recording apparatus according to claim 1, wherein the target evaluation index is a value obtained by multiplying by a predetermined coefficient exclusive of zero and one the evaluation index, which is determined from said reproduced RF signal obtained by reproducing said data exclusively used for reproducing in the embossed part.

4. An optical disk recording apparatus according to claim 1, wherein the target evaluation index is a value obtained by adding or subtracting a predetermined constant exclusive of zero to the evaluation index, which is determined from said reproduced RF signal obtained by reproducing said data exclusively used for reproducing in the embossed part.

5. An optical disk recording apparatus according to claim 1, wherein the target evaluation index is determined, respectively in accordance with the recording of the lands and grooves.

6. An optical disk recording apparatus according to claim 1, wherein said set of evaluation indexes are beta values $\beta$, which can be determined as $\beta=(A+B)/(A-B)$ from the peak voltage A and the bottom voltage B of an envelope of the AC coupled reproduced RF signal.

7. An optical disk recording apparatus according to claim 1, wherein said set of evaluation indexes are modulation factors m, which can be determined as $m=(A-B)/A$ from the peak voltage A and the bottom voltage B of an envelope of the reproduced RF signal containing a DC component.

* * * * *